United States Patent [19]

Yamashita et al.

[11] Patent Number: 4,666,725
[45] Date of Patent: May 19, 1987

[54] PROCESS FOR PRODUCING BLOOD POWDER

[76] Inventors: Seiji Yamashita, 14-3, Nakamura-cho 1-chome, Minami-ku, Yokohama 232; Turukichi Yokogawa, 17-25, Okamura-cho 3-chome, Isogo-ku, Yokohama 235, both of Japan

[21] Appl. No.: 785,328

[22] Filed: Oct. 7, 1985

Related U.S. Application Data

[63] Continuation-in-part of Ser. No. 597,226, Apr. 5, 1984, abandoned.

[30] Foreign Application Priority Data

Jul. 21, 1983 [JP] Japan ................................ 58-131932

[51] Int. Cl.$^4$ ................................................. A23B 4/04
[52] U.S. Cl. ..................................... 426/465; 426/646; 426/647
[58] Field of Search ............... 426/465, 641, 647, 807, 426/645

[56] References Cited

U.S. PATENT DOCUMENTS

| | | | |
|---|---|---|---|
| 609,057 | 8/1898 | Sorensen | 426/635 |
| 3,527,642 | 9/1970 | Harrison et al. | 426/635 |
| 3,615,651 | 10/1971 | Parks | 426/647 |
| 4,122,208 | 10/1978 | Tronstad | 426/641 |
| 4,219,586 | 8/1980 | Parks, Jr. | 426/647 |

Primary Examiner—R. B. Penland
Attorney, Agent, or Firm—Trexler, Bushnell & Wolters, Ltd.

[57] ABSTRACT

Blood is supplied continuously from a blood collecting vessel to a stirrer through a pump located at the bottom of the vessel. Vapor in the form of heated live steam is sprayed against the blood in the stirrer to coagulate a protein in the serum. The blood containing the coagulated protein and water, and other substances are dehydrated to form a solid product containing water. This product is divided into fine particles, and these particles are dried to form blood powder having a water content of about 15%.

2 Claims, 5 Drawing Figures

4,666,725

PROCESS FOR PRODUCING BLOOD POWDER

REFERENCE TO RELATED APPLICATION

This application is a continuation-in-part of our earlier application, Ser. No. 597,226, filed Apr. 5, 1984, now abandoned.

BACKGROUND OF THE INVENTION

1. Field of the invention:

This invention relates to a process for producing blood powder by the continuous and automatic drying of the blood discharged from a slaughtered animal. The blood powder consists mainly of the coagulated and dried product of the proteins existing in the serum, but also contains cruor consisting of coagulated fibrin.

2. Description of the Prior Art:

Blood powder consists essentially of a good protein, and has been considered as providing an important assorted feed or compound fertilizer. Blood is, however, liable to decomposition far more quickly than other proteins, and the decomposed blood sends off an objectionable smell during the production of blood powder. Extensive facilities are required for preventing the scattering of any such smell. Moreover, as blood contains a lot of water, its drying requires a lot of time and a lot of fuel. This necessarily raises the cost of production of blood powder. Therefore, the current production of blood powder is greatly limited, and does not occupy more than 0.1% of the total assorted feed production. The majority of the slaughterhouses dispose of blood by activated sludge treatment with waste water. If it is possible to separate blood from any such sludge and utilize it, the load on an activated sludge system will be reduced to about one-third. This means a drastic reduction in the cost of equipment and operation.

The drying of blood for producing blood powder has hitherto been carried out by vacuum or spray heating. The conventional vacuum drying system does, however, not start heating until a certain quantity of blood is collected in a vessel. There is every likelihood that blood may be decomposed and send off an objectionable smell before the system is placed in operation.

According to the conventional spray drying system, blood is sprayed down from a height of about 10 m, and hot air is horizontally blown against the blood. It is, however, difficult to blow hot air uniformly against blood, and a part of blood which is not completely dried is decomposed and sends off an objectionable smell. The system is so large that it is very expensive to shield the whole system completely from its environment. The system also has a number of control problems, including the burning of blood by overheated air.

U.S. Pat. No. 3,615,651 discloses gelatinizing blood from which about 50 or 60 percent of water content has been vaporised through the injection of live steam. Also, U.S. Pat. No. 4,219,586 teaches an auger press by which at least 50% of the moisture from the gelatinous mass of blood is squeezed during the latter stage of augering and subsequent to gelatinizing.

However, extremely dry blood powder of good and uniform quality is not obtained without finding a solution to the below-mentioned problem. It is well known that blood plasma contains not only serum but also fibrinogen. The fibrinogen is exposed in air, so that it coagulates as a network of insoluble fibrin and forms the outer surface of a lump, with water content enclosed therein. This bio-phenomenon originally occurs to prevent the flow of blood from a wound in the living body.

The bio-phenomenon of fibrin also occurs during dehydrating work, with water content being enclosed into the lump made from the fibrin, by which sufficient dehydration is prevented or impeded.

It is considered to heat at a high temperature the lump enclosing water therewithin, in order to remove the water therefrom. However, upon heating the lump enclosing water at the high temperature, saccharide and soluble protein in the serum exude to the outer surface of the lump, and are concentrated. As the concentrated liquid has very strong adhesive properties, the lumps tend to adhere together to form a number of larger lumps. As such, the overall outer surface area of the lumps is reduced, and the drying of the blood is prevented or hampered.

SUMMARY OF THE INVENTION

It is an object of this invention to provide a novel and improved process which can produce blood powder at a drastically reduced cost without allowing blood to send off any objectionable smell.

It is another object of this invention to provide a process which makes it possible to produce dry blood powder of good and uniform quality continuously, automatically and quickly.

It is a further object of this invention to provide a process which removes water being enclosed into the lump made from a network of insoluble fibrin.

It is a still further object of this invention to provide a process which heats the lump enclosing water therewithin at a moderate temperature of such extent that concentrated liquid of saccharide and soluble protein do not exude to the outer surface of the lump of blood from the serum therein.

These objects are attained by a process which comprises supplying blood to a stirrer continuously through a pump located at the bottom of a blood collecting vessel, spraying vapor against the blood in the stirrer to coagulate a protein in the serum, squeezing water out of those blood constituents to form a water-containing solid product having a water content of 30 to 70%, dividing the solid product finely, and drying the finely divided product in a hot air drier having a temperature of about 100° C. to form blood powder having a water content of about 15%.

According to this invention, blood does not stay in the collecting vessel for any appreciable length of time, but is continuously transferred to the stirrer by the pump. The coagulation of a water-soluble protein in the serum is effected in the stirrer. Then, water is squeezed out of the blood constituents to form a water-containing solid product. This product has a large volume and a hard surface layer consisting of a network of insoluble fibrin and contains water in its interior. This water is confined in the interior by the hard surface layer, and is not easily released therefrom. It is, therefore, likely that the blood may be decomposed. This problem can be avoided if the solid product is finely divided into particles having, for example, a side length of about 2 mm and a volume of about 8 mm³, so that the water in the interior may be exposed and removed easily. The finely divided product is dried in a hot air drier having a temperature of, say, 65° C. to 150° C. to yield good, odorless blood powder having a water content of about 15%. There is no fear that the recombination of blood particles which will hinder their satisfactory drying may take place.

DESCRIPTION OF THE PREFERRED EMBODIMENT

Figure 1:
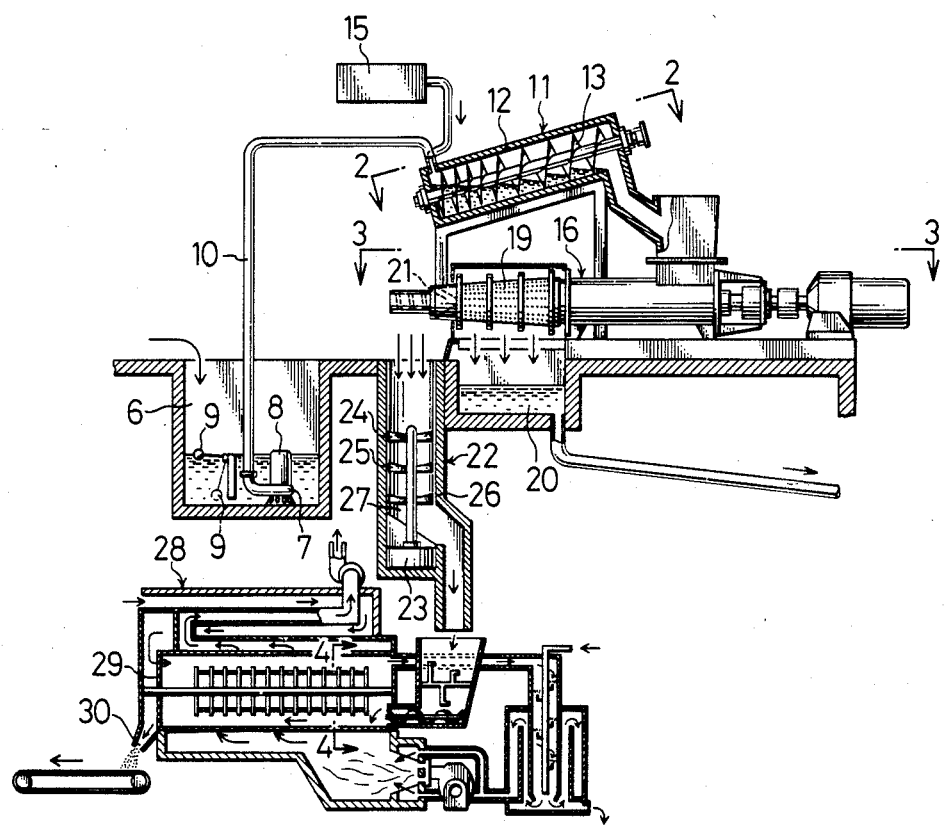
FIG. 1 is a view illustrating the process of this invention.
Figure 4:
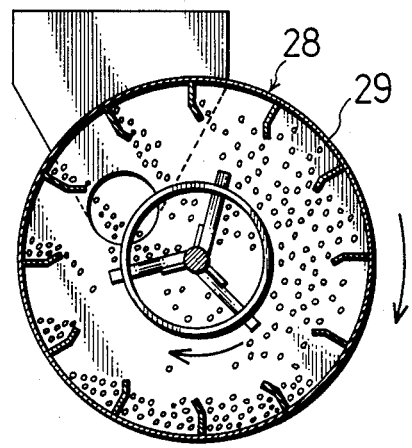
FIG. 4 is a vertical sectional view taken along the line 4—4 of FIG. 1.
Figure 2:
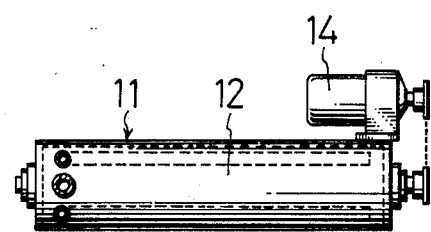
FIG. 2 is a top plan view taken along the line 2—2 of FIG. 1.

Referring to FIG. 1 of the drawings there is shown by way of example a system which can be employed for carrying out the process of this invention. The system includes a blood collecting vessel 6 which is provided with a pump 7 at its bottom. A motor 8 is provided for rotating the pump 7, and its operation is discontinued if a floating sensor 9 drops to its lowermost position. If the sensor 9 rises from its lowermost position as a result of blood flowing into the vessel 6, the motor 8 starts its operation to drive the pump 7 to transfer blood from the vessel 6 to a stirrer 11 through a pipe 10. The motor 8 is, however, not started until the stirrer 11 is heated by vapor to a predetermined temperature.

The stirrer 11 comprises an inclined cylinder 12, a screw conveyor 13 disposed in the cylinder 12 rotatably along its inner peripheral surface, and a motor 14 which rotates the shaft of the screw conveyor 13. The pipe 10 is connected to the top of the cylinder 12 at the lower end thereof to deliver blood thereinto. Vapor in the form of heated live steam is supplied from a boiler 15 to the cylinder 12 through a pair of inlets on the opposite sides of the pipe 10 to fill the cylinder 12 and maintain its interior at a high temperature. The vapor may be introduced by spraying against the blood if desired. The blood and vapor in the cylinder 12 are mixed together by the rotation of the screw conveyor 13, whereby the protein in the serum is coagulated.

Figure 3:
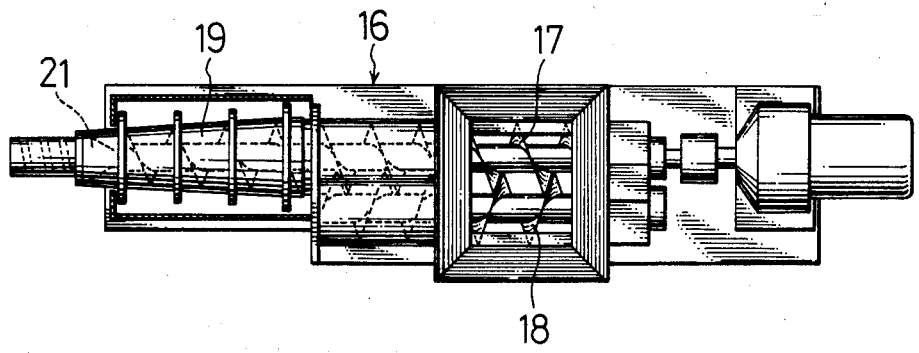
FIG. 3 is a top plan view taken along the line 3—3 of FIG. 1.

Even if the protein and water have been separated from each other, they still coexist in mutually intimately contacting relationship. Therefore, the blood constituents containing such protein and water, and other substances are transferred to a dehydrator 16 so that water may be squeezed out. The dehydrator 16 includes two screws 17 and 18, and a perforated cover 19 surrounding an end portion of the screw 17, as shown in FIGS. 1 and 3. The cover 19 is formed from a net having a mesh size of, say, 1 mm. The blood constituents are compressed between the screws 17 and 18 and forced to the left as viewed in FIGS. 1 or 3. The water squeezed out of the blood constituents flows down through the wall of the cover 19 into a water receptacle 20 to be thrown away. The dehydrated blood constituents are forced further to the left by the rotation of the screw 17, and discharged, as their pressure pushes a conical plug 21 open.

The blood constituents discharged from the dehydrator 16, however, are a solid product in the form of lumps of coagulated blood containing 30 to 70% of water. The fibrinogen in the blood serum is exposed to air during the foregoing process and therefore coagulates as a network of insoluble fibrin which forms the outer surface of the lump. Accordingly, if the lumps are dried as they are, they are solidified only on the outer surface, and the solidified surface confines water in the interior, preventing or impeding sufficient dehydration. This is likely to cause the decomposition of blood. Heating alone, in an effort to remove the enclosed water will cause some of the above-mentioned "other substances" in the serum, and particularly saccharide and soluble protein, to exude to the outer surface of the lump and become concentrated. This concentrated substance has strong adhesive properties, such that the lumps will tend to adhere together and form larger lumps. This reduces the overall outer surface areas of the lumps, further hampering or preventing the drying of the blood.

According to this invention, therefore, the lumps of coagulated blood are finely divided by a crusher 22 into particles having a volume of, say, 8 mm$^3$ (particle size of about 2 mm). The crusher 22 includes a plurality of impeller wheels 24 to 26 disposed in vertically spaced apart relationship in a vertical hole 27 and carried on the output shaft of a motor 23. The lumps fall into the vertical hole 27 and are finely divided for downward delivery into a hot air drier 28.

Figure 5:
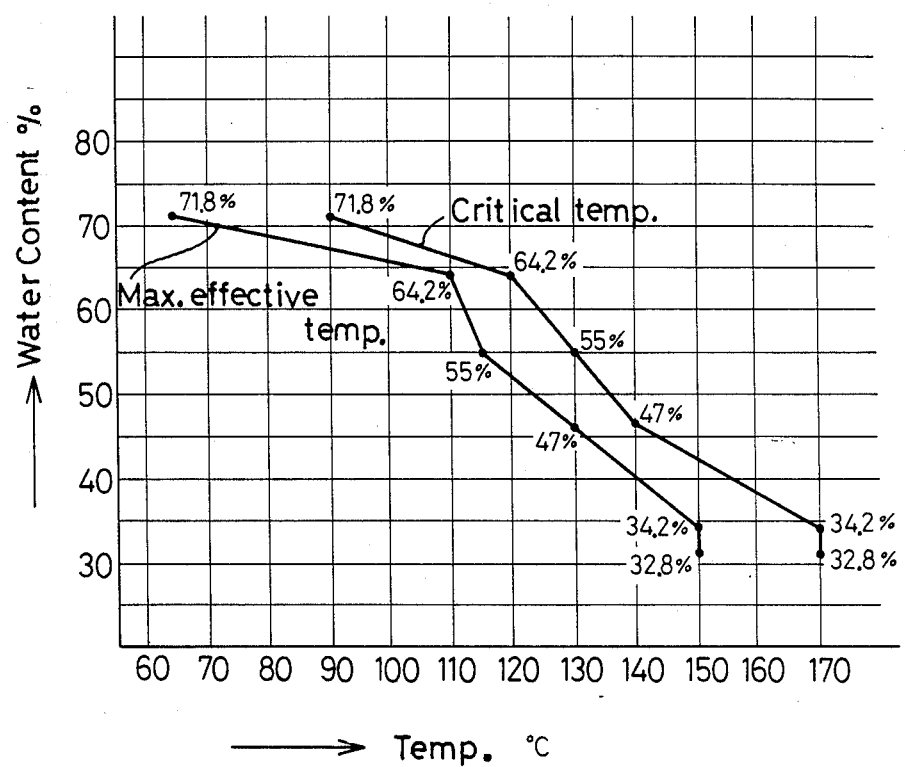
FIG. 5 is a graph showing an effective heating temperature for the finishing stage of the process in relation to the water content of the material.

The drier 28 comprises a rotary drum 29 and a mechanism for circulating hot air around the drum 29. The finely divided particles are heated by hot air having a temperature which is selected in relation to the water content of the particles, as shown in FIG. 5. The particles are moved through the drum 29 to the left as viewed in FIG. 1, and when they are discharged through an outlet 30 at the left end and bottom of the drum 29, they are in the form of dry blood powder having a water content of, say, 15%.

Referring to FIG. 5, a fine blood powder of good quality can be obtained from, for example, particles containing 65% of water if they are heated at a temperature of about 100° C. in the drum 29, but if they are heated at a temperature of 120° C. or above, they combine themselves into larger particles which are not satisfactorily dry in the interior. Likewise, fine powder having a water content of about 15% can be obtained from particles containing 50% of water if they are dried at a temperature not exceeding about 125° C., but if they are dried at a temperature of about 135° C. or above, they combine themselves and are not dried satisfactorily, resulting in the failure to produce good blood powder. The maximum effective drying temperature and critical drying temperature ranges for the varying water content of the particles to be dried may be obvious from FIG. 5.

What is claimed is:

1. In a process for producing blood powder and including the steps of: supplying blood continuously from a blood-collecting vessel to a stirrer, mixing heated live steam with blood in said stirrer to coagulate protein present in the blood as a constituent thereof, transferring partially coagulated blood constituents to a dehydrator, and employing the dehydrator to remove water from the blood constituents to form a solid product having a water content of about 30%–70%, pulverizing the solid product from the dehydrator to produce finely-divided particles having a volume of about 8 mm$^3$, and drying the finely-divided particles within a temperature range of from about 65° C. to 150° C. to form a blood powder having a water content of about 15%, the improvement consisting essentially of: controlling the temperature employed during drying of the finely-divided particles to prevent the finely-divided particles from adhering to one another to form enlarged particles having reduced exposed overall surface areas, impairing ease of drying and resulting in inferior end products, said step of controlling the temperature during drying of said finely-divided particles by regulating the drying temperature as a function of water concentration present in said finely-divided particles wherein maximum effective and critical temperatures for drying particles having specific water contents are shown in FIG. 5.

2. A process according to claim 1, wherein the step of regulating the temperature during drying includes the step of selecting a drying temperature for particles having an water concentration of about 65% being up to about 100° C. and below 120° C., and the drying temperture for particles having an water concentration of about 50% being up to about 125° C. and not exceeding 135° C.

* * * * *